Sept. 10, 1968    R. B. COTTON    3,400,903
THRUST AUGMENTER MEANS
Filed June 14, 1966    3 Sheets-Sheet 1

INVENTOR
Robert B. Cotton

BY *Birch and Birch*

ATTORNEYS

INVENTOR
Robert B. Cotton

BY *Birch and Birch*
ATTORNEYS

Sept. 10, 1968     R. B. COTTON     3,400,903
THRUST AUGMENTER MEANS
Filed June 14, 1966     3 Sheets-Sheet 3
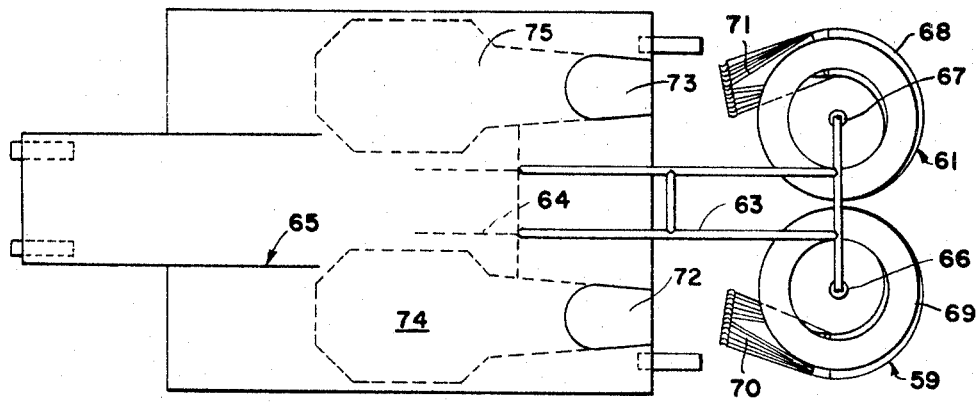
FIG.9.
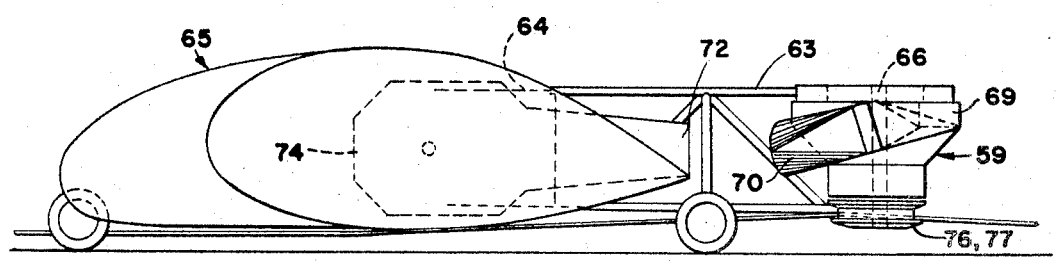
FIG.10.
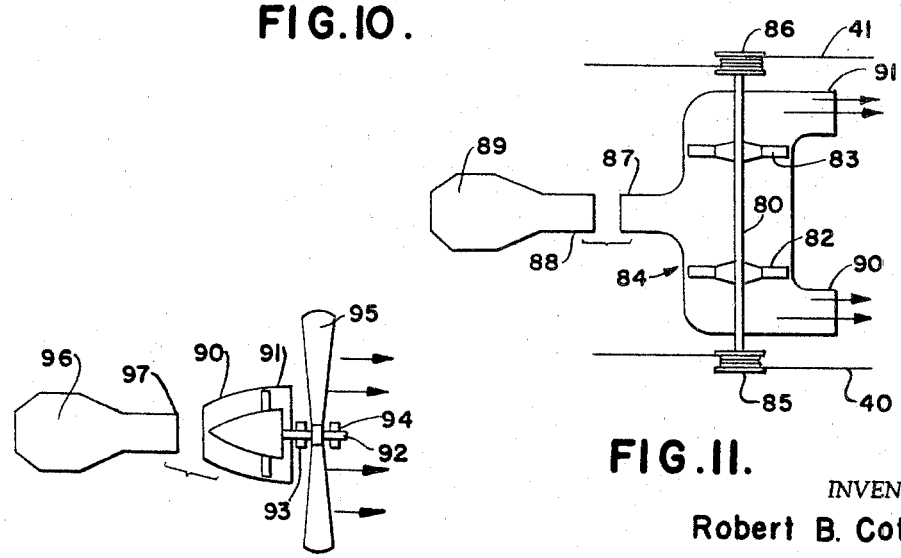
FIG.11.
FIG.12.
INVENTOR
Robert B. Cotton
BY *Birch and Birch*
ATTORNEYS

United States Patent Office 3,400,903
Patented Sept. 10, 1968

3,400,903
THRUST AUGMENTER MEANS
Robert B. Cotton, Media, Pa., assignor to All American Engineering Company, Wilmington, Del., a corporation of Delaware
Filed June 14, 1966, Ser. No. 557,448
21 Claims. (Cl. 244—63)

ABSTRACT OF THE DISCLOSURE

The thrust of a jet propelled object such as a jet airline or a jet car is augmented by directing the exhaust gases from the jet powered object to a following vehicle in driving engagement. A reactive means, such as a turbine, on the vehicle operates an output drive, such as a capstan, to propel the vehicle and push the jet powered object forward.

---

The present invention relates generally to thrust augmenter means and more particularly to launching jet powered objects by the capture and utilization of exhaust gases of the objects being launched.

An object of this invention is to provide thrust augmenter means for launching including turbine means powered by the exhaust gases applied to the turbine blades of the turbine means from the jet engines of a mobile object to be launched from a sea or a land based surface.

Another object is to provide a substantially completely controlled pilot operation of the engines of a jet powered craft to augment thrust to a turbine launcher during driving and launching of the jet powered craft during take-off roll along and from a runway.

A further more specific object is to provide a gas driven launcher turbine and dolly assembly with a craft engaging pusher and driven capstan members rotatable by the turbine along a fixed loop of cable, whereby rotation of the capstan by the turbine causes them to "climb" or drive along the spaced apart reaches of the fixed loop of cable, whereby when the pusher is engaged with a solid part of a jet powered aircraft to be launched the same may be effectively accomplished with a relatively short take-off roll along a runway surface by the energy of the captured exhaust gases of the aircraft being pushed for launching.

Another object is to provide, in combination, a jet exhaust powered radial flow turbine means with an axle mounted on a wheel dolly with a track engaging shoe means on a guide track along a runway or the like including a releasable pre-launch holding means and an after launch brake means.

Yet another object is to provide an arrangement for augmenting thrust to a jet powered jet car used to test dead loads or to launch aircraft and the like.

A further object is to provide simplicity and economy in power driving and launching arrangements completely controlled by a pilot in the aircraft being launched with elimination of all usual complex and costly extra power plants and fuel storage means.

With these and other objects in view, the invention consists in the construction, arrangement and combination of parts hereinafter described and particularly summarized in the appended claims, it being expressly understood that there is no intent to limit this invention to the present disclosed details of construction.

In the drawings, like parts throughout the several views are given like numerals and thereby identified in the following detailed description:

FIGURE 9 is a third embodiment of the invention and a top plan view of a jet car positioned to flow captured exhaust gases of the jet car engines to the blades of axial flow turbines;

FIGURE 10 is a side elevation view of the arrangement of FIGURE 9;

FIGURE 11 is a diagrammatic illustration of a fourth embodiment and shows an axial flow dual turbine arrangement; and FIGURE 12 is a fifth embodiment of a thrust augmenter aligned with the outlet of a jet engine means showing a propeller means on a shaft driven by an exhaust flow of gas to a turbine mounted on the propeller means shaft.

Figures 1, 2, 3, 4:
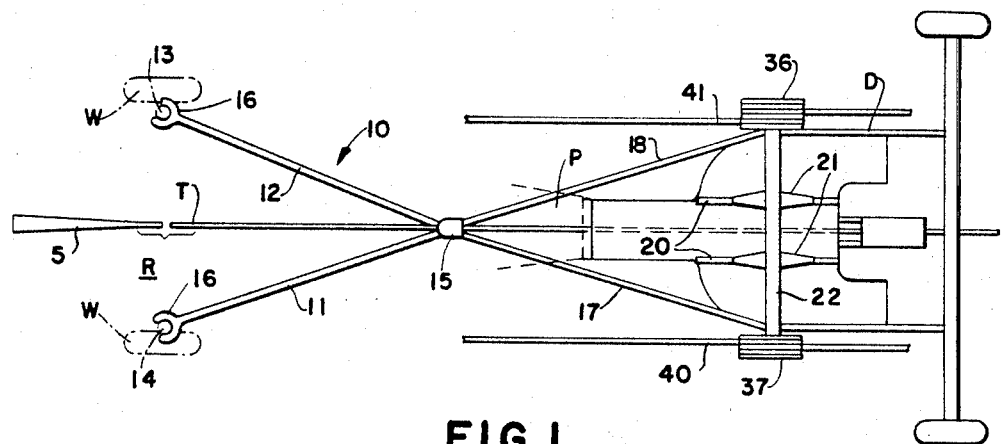
FIGURE 1 is a top plan view of a novel thrust augmenter arrangement for aircraft launching, showing an axial turbine and dolly with a pusher means engaged with the undercarriage of a jet aircraft and with the tail pipe directed toward the turbine blades of the axial turbine.
FIGURE 2 is a side elevation view of the arrangement of FIGURE 1.
FIGURE 3 is a semi-diagramatic showing of the stationary reaches of a tensioned fixed loop of cable and the capstans carried by the turbine wheel axle, which capstans when turned in effect climb along the cable reaches.
FIGURE 4 is a top plan schematic view of a second embodiment of the invention with a radial flow turbine used as a thrust augmenter for a jet car.
Figure 6:
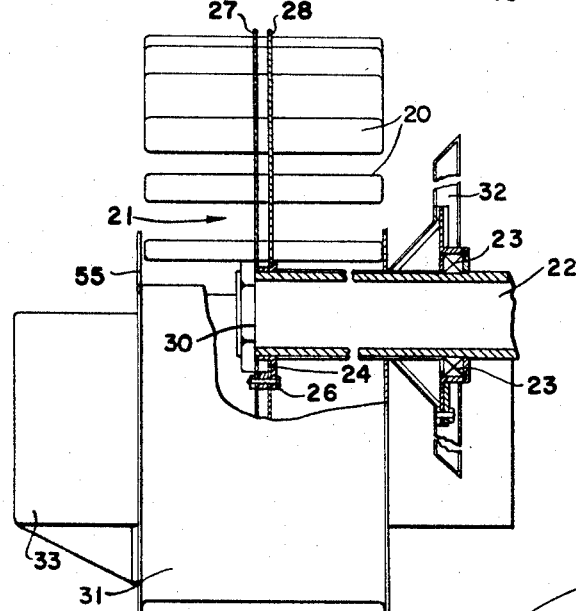
FIGURE 6 is a front peripheral view of a radial flow turbine wheel and axle mounting therefor with the axle in cross section as used with the first and second embodiments.
Figure 7:
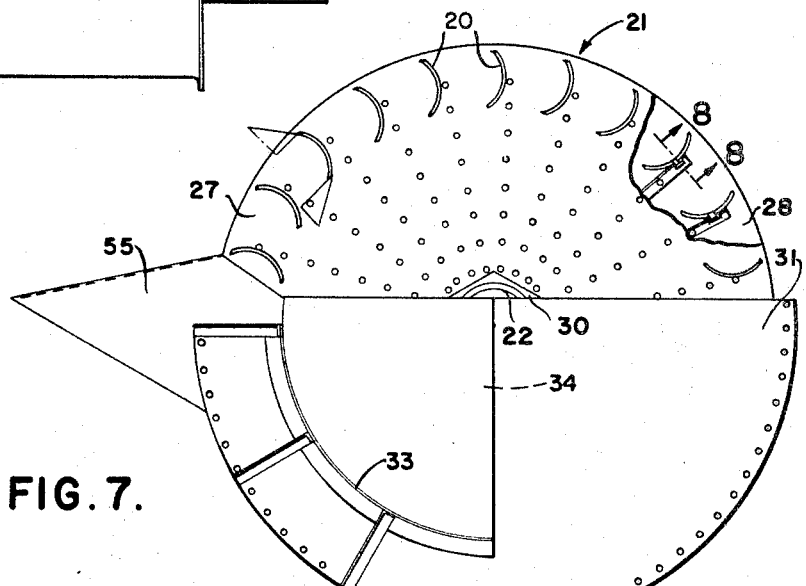
FIGURE 7 is a side elevation view of the turbine wheel of FIGURE 6.

Referring in detail to the drawings and first with particular reference to FIGURES 1, 2 and 3, there is shown a jet aircraft A to be launched from a runway R with a central guide track T, wherein the aircraft undercarriage rear wheels W on each side of the guide track are engaged by a pusher means, such as a V-shaped yoke 10 with pusher bars or arms 11 and 12 pivoted at the apex to a track engaging slipper or shoe 15 engaged at forked ends 16 with spaced strut members 13 and 14 of each rear aircraft strut. The slipper or track shoe 15 is also connected to rearwardly diverging frame bars 17 and 18 of a turbine dolly D hereinafter described. Also, the tail pipe P of the jet aircraft A is positioned to direct and apply a flow of exhaust gases from the tail pipe P, or if there are dual tail pipes, on the turbine blades 20 of turbine wheels 21, such as illustrated in FIGURES 4 and 6 of the second embodiment.

The turbine 21 is mounted on a wheel supported frame or dolly D, see FIGURES 1 and 2, and is journalled to turn axle shaft 22 with the capstans 36 and 37. As the turbine wheel 21 is driven by exhaust gas energy, the capstans revolve and are thus forced to move along a fixed loop of cable 38 when the turbine applies torque to the capstans. The cable 38 is reeved around an equalizer sheave 39, see FIGURE 3, and loops therefrom to attach to a suitable cable tension means, such as for example sections of nylon rope or tape 42 suitably coupled to the ends 40 and 41 of the fixed cable. The coupling means between the cable and nylon tension means may be any suitable coupling arrangement such as linked clevis members 43, see FIGURE 4 of the second embodiment. In each embodiment described the track, the cable loop and its tensioning and mounting may be identical. However, in some instances the track may be eliminated and the cable may be single cable sections not in a loop.

Thus from the foregoing description in connection with the first embodiment in FIGURES 1, 2 and 3, the basic feature of the arrangement is to utilize the exhaust gases of the jet engine, of the airplane being launched, to provide the energy necessary to operate the launcher during the launch roll-out along the runway R.

The turbine wheel or wheels 21 of each respective embodiment one and two may be mounted or splined on an axle 22. The hub of the turbine wheel as shown in FIGURES 4 and 6 comprises a collar 24 with a mating bore and keyway for slidably mounting over the axle 22 to spacer or bearing 23, said collar being secured by bolts 26 to spaced turbine blade mounting rings or annulus means 27 and 28.

The turbine structures of FIGURES 1, 2 and 3 may be the same as shown in FIGURES 4, 5, 6 and 7, wherein the turbine axle mounts a radial flow turbine wheel at each end of the axle 22 rather than one single axial flow turbine wheel at the center of the axle as shown schematically in FIGURES 1 and 3.

The turbine wheel or wheels generally referenced by the numeral 21, as shown in FIGURE 6, have a retaining nut 30 suitably secured over the end of the axle 22 and the lower half of the turbine wheel may be partly enclosed by a shroud 31 and a laterally positioned circular plate 32 adjacent the inboard side of the wheel and an exhaust outlet scoop 33 at a cut-out 34 in the shroud 31 on the both sides of the wheel. Plate 32 is a deflector to help keep hot gas from damaging the respective adjacent capstan and cable arrangements. The shroud 31 increases the efficiency of the gas flow by reducing pumping of the gases at this location of the turbine.

Brake 3 on shoe 15 provides releasable pre-launch holding means and after launch brake means. Prior to launching, the holding action of brake 3 permits energy to be stored in turbine 21. Track T has a relatively thicker section 5 at its launching end to actuate brake 3 to arrest turbine propelled dolly D.

Figure 5:
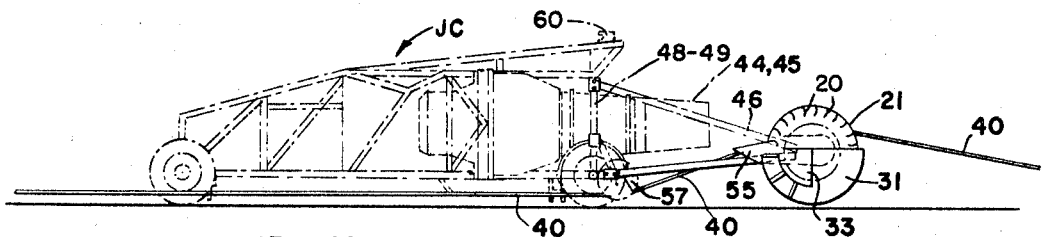
FIGURE 5 is a side elevation view of a jet car positioned to exhaust into the radial turbine of the thrust augmenter arrangement.
Figure 8:
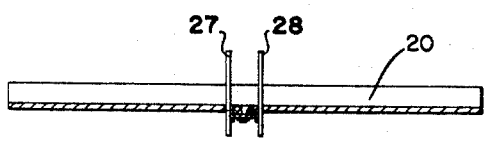
FIGURE 8 is a section view taken of a blade mounting on the line 8—8 of FIGURE 7.

The second embodiment of the invention is illustrated in FIGURES 4 and 5 for augmenting thrust to jet cars. For example, as in the aircraft launching arrangement the basic concept is to capture and utilize the kinetic energy in the exhaust gases from the jet engines of the jet car to provide the power necessary to operate the launching apparatus during a test of a launch stroke. For example, specifically with reference to FIGURES 4 and 5, there is shown a jet car JC with jet engines having tail pipes 44 and 45 with a trailing framework 46. The framework may be, for example, secured to the upright rear frame members 48 and 49 of the car and extends rearwardly in spaced arrangement to connect and carry spaced journal means 51 and 52 to journal the turbine axle 22. The axle 22 and the respective turbine wheels 21 splined or keyed to each end of the axle have been described supra in reference to FIGURE 8 and in reference to the half-shroud 31 around the lower periphery of the turbine wheels 21. Also, when aligned at the rear of the jet car with their respective tail pipes 44 and 45, the turbine wheels 21 each have an air scoop 55 adapted to capture and direct the tail pipe exhaust gases into the upper exposed periphery of the respective wheels 21.

As the gas flows against the turbine blades 20 of the respective turbines the axle and capstans 36 and 37 are rotated, whereby the capstans climb along the cable reaches 40 and 41 and add to the normal thrust of the jet car.

During the forced forward climbing action of the capstans 37 and 36 along the fixed cable, it is important to retain the cable under tension and equalized in a level position over the runway R. Accordingly, the cable reaches 40 and 41 are reeved under sheaves 57 and 58 mounted on the lower portion of the jet car frame at each respective side thereof and thence forward over the runway R to reeve around the equalizer pulley or sheave 39, see FIGURES 4 and 5.

The jet car may be provided with a pusher means at the forward end to engage with a dead load, not shown, for testing or to any type of craft for launching as desired. Also, the upper part of the jet car frame 46 is formed with an arrest hook 60 for engagement with any suitable type of runway arrest cable, for example, such as is shown in U.S. Patent No. 3,172,625 issued Mar. 9, 1965, and assigned to All American Engineering Company of Wilmington, Del.

A third embodiment of the invention as shown in FIGURES 9 and 10 consists of a thrust augmenter assembly with axial bow type turbines 59 and 61 mounted on a rearwardly extending frame 63 secured to the rear of the frame 64 of a jet car 65.

These axial flow turbines are mounted on axle means 66 and 67 in a housing 68 and 69 with scroll type ducting 70 and 71 to direct the exhaust gases captured from the exhaust tail pipes 72 and 73 of two or more jet engines 74 and 75 on the jet car 65. This arrangement like the previously described embodiments one and two is used with the same fixed cable loop, equalizer sheave and tension means and the opposite reaches of the cable loop wrap around capstans 76 and 77 on the lower end of the respective axle means 66 and 67.

The respective turbine housings are each provided with an inlet in alignable position with the exhaust outlet of the respective tail pipes 72 and 73 of the jet car engines. As the high velocity force of the captured exhaust gas flows upon the blades of the turbines in the respective housings with the scroll ducting, a torque is developed by the turbines and they turn the capstans wrapped with portions of the reaches of the cable loop. This causes the capstans to "climb" along the stationary cable reaches and as the respective capstans turn the torque developed by them is transferred directly into a push on the jet car.

Several forms of axial flow turbines with scroll type ducting may be used, for example, note the schematic representation in FIGURE 11. In FIGURE 11 there is shown a single shaft 80 with turbine wheels 82 and 83 and capstans 85 and 86 on each end, said turbine wheels being within a single housing 84 having an inlet 87 aligned with the tail pipe 88 of a jet power engine 89 of an aircraft, a jet car or any jet powered mobile object.

The diagrammatic illustration in FIGURE 11 may include the same identical fixed cable looped and held under tension over the runway surface R.

In FIGURE 12 is illustrated schematically another embodiment of the invention having a turbine housing 90 with an inclosed axial flow turbine 91 therein. This turbine is on a rotatable shaft 92 journalled in bearings 93 and 94 supported in a suitable frame structure not shown and on this shaft is secured a relatively large propeller 95. This propeller is positioned to provide thrust to a dolly or jet car on the rear of which it is mounted said car having a jet engine 96 and exhaust tail pipe 97 to drive the turbine 91.

In this arrangement no cable or capstan means are required as the propeller alone will supply thrust as the connected turbine 91 picks up the exhaust from the tail pipe 97 to impart drive thereto.

In instances where it is impractical to have a track and to have an anchored cable for wrapping around the capstan means carried by the launching dolly, it may be more efficacious to eliminate these elements and simply use the captured exhaust from the mobile bodies being launched and providing power to the launching turbine means on the dolly. The elimination of the cable, the track and the capstan means may be particularly desirable whenever it becomes important to have an expeditionary unit for quick operation. When this is done the dolly ground wheels or some suitable surface engaging means are all that are needed with some suitable transmitting means from the turbine shaft means. Also, a suitable arrest means should be used in place of the track brake arrangement. The arrest means used may be of some expeditionary type rather than a track type brake means used for more permanent installations. Usually arrest engines having cross cables for arrest hook engagement are sufficient, such as hereinbefore referred to in reference to U.S. Patent 3,172,625, issued to Donald B. Doolittle.

When the capstan drives are eliminated power may be transmitted direct to the dolly wheels W by suitable gear transmissions from the turbine shaft to the wheels, but the preferred arrangement is to key the wheel hubs directly to the turbine shaft 22, instead of capstans 36 and 37 as shown in FIGURE 1. Thus, by directly keying the wheels W to the turbine shafts 22 no transmissions are needed other than the key connections between wheel hubs and the turbine shafts.

Without further description it is believed that the advantages of the present invention over the prior art is apparent and while several embodiments of the same are illustrated, it is to be expressly understood that the invention is not limited thereto as various changes may be made in the combination and arrangement of the parts illustrated, as will now likely appear to others and those skilled in the art. For a definition of the scope or limits of the invention, reference should be had to the appended claims.

What is claimed is:

1. A launcher, in combination with pilot controlled jet engine powered aerial devices comprising a track having a battery end and a launching end, a continuous fixed loop of cable having each reach of the loop spaced along each side of the track from the battery to the launching end and a radial turbine, said turbine, having an axle, rotatable capstan means secured to the axle, a wheel supported frame to provide a turbine powered dolly and track engaging means on the dolly, said cable having each reach thereof partly wound on said capstans, and pusher means carried by said turbine dolly engageable with the solid part of a pilot controlled aerial jet engine device in front of said turbine dolly, exhaust gases from said jet engine imparting rotation to said turbine and power to rotate the capstans, to thereby cause them to climb along the cable so said turbine dolly will propel said aerial jet engine device from the battery end to the launching end of the track.

2. A launcher as described in claim 1, wherein pre-launch releasable holding means are provided at the battery end, to thereby store energy in the turbine for launching an aerial jet engine powered aerial device positioned to supply exhaust gases to said turbine to augment thrust by capture of its own exhaust gas energy.

3. A launcher as described in claim 2, including an after launch track controlled brake means mounted on said track carried by said turbine dolly.

4. A launcher as described in claim 2, wherein said track has a relatively thicker section at the launching end of the track to actuate said brake means to arrest the turbine powered dolly.

5. A launcher as described in claim 1, wherein said turbine is a radial turbine having an upper exposed periphery with shroud means around the lower periphery thereof, said exposed periphery of the turbine being alignable with the exhaust outlet of the tail pipe of the jet powered aerial vehicle on said track.

6. A launcher comprising a turbine, a turbine axle shaft, said shaft being journalled to revolve in a wheel supported frame, a capstan secured on each end of the shaft, a fixed cable in a U-formed loop coiled intermediately around each capstan at oppositely positioned locations of each adjacent reach of the cable loop, said fixed loop being reeved around a sheave anchored on a suitable launching surface at one end and being fastened at one free end of the U-formed cable loop to a tensioning means and at the other free end to an anchor means, said turbine having blades positioned adjacent to the outlet of a tail pipe of a jet engine of a mobile object adapted to be launched by exhaust gas energy from said tail pipe of the jet engine, whereby when the turbine revolves rotation is imparted to the capstan and pusher means extending forward from said wheel supported frame engaged with a solid part of the mobile object.

7. A launcher as described in claim 6, wherein said pusher means includes a track engaging shoe for a runway with a guide track.

8. In combination, a mobile object having jet engine power plants with tail pipes each with an exhaust opening for each respective power plant, and spaced radial turbine wheels, an axle journalled in bearings at the rear of the said object, said turbine wheels being keyed to said axle adjacent the respective exhaust openings of each tail pipe and having the upper array of blades of the respective turbine wheels exposed to the flow of exhaust gases from said tail pipes, spaced apart capstans likewise keyed to said axle, one of each capstans being adjacent to one of said turbine wheels, and a tensioned cable loop mounted along a runway over which said object is movable and having one reach of the loop extending from each of said capstans, said cable being reeved around an equalizer sheave on the runway, whereby rotation of said turbine wheels by the exhaust gases from said jet power plant tail pipes forces said capstans to rotate and move along the reaches of said cable loop, thereby augmenting the normal jet driving thrust of the jet engine power plants for propulsion of said object.

9. The combination defined in claim 8, wherein said cable loop opposite to said equalizer sheave on the runway is coupled to tensioning means, said means comprising linear sections of nylon material.

10. A thrust augmenter means for connection with jet propelled mobile objects having exhaust tail pipe means comprising a frame, turbine means mounted for rotation in the frame, said turbine means being secured to axle means journalled in spaced bearing means in the frame, said turbine means being positioned adjacent the tail pipe means, to thereby capture the exhaust gases emitted from the said tail pipe means, capstans secured on said axle means, and a cable wrapped around the capstans, said capstans rotating with the turbine means and thereby augmenting the jet propulsion of the mobile object.

11. A thrust augmenter means as described in claim 10, wherein the turbine means are radial flow turbines.

12. A thrust augmenter means as described in claim 10, wherein the turbine means are axial flow turbines and said turbines are mounted in a housing having scroll type ducting.

13. In combination, an aircraft, said aircraft having jet power means with tail pipe means provided for discharge rearwardly of exhaust gases during operation of the jet power means, and a turbine supporting dolly having launching surface engaging means and pusher means engaged with a solid part of said aircraft, said surface engaging means providing surface mobility to the said dolly, said dolly having spaced bearing means, turbine means on shaft means journalled to be rotated in said bearing means from the flow of exhaust gases into the turbine means, said turbine and shaft means having connecting means to impart driving power to said launching surface engaging means with resulting mobility to the turbine dolly, to thereby push said aircraft forward over said launching surface with said pushing means.

14. The combination described in claim 13, wherein said turbine means are radial flow turbines.

15. The combination described in claim 13, wherein said turbine means are axial flow turbines.

16. The combination described in claim 13, wherein said tail pipe means are adjacent to a scroll type housing with an inlet and an outlet and said turbine means are enclosed in said housing to receive the flow of gases from said tail pipe means.

17. The combination described in claim 13, wherein said turbine means includes a drive shaft to a propeller means.

18. Thrust augmenting means for jet propelled mobile objects utilizing the thrust of exhaust gases from an exhaust opening for self-propulsion, comprising vehicle means drivingly engaging said jet propelled mobile object, intake means on said vehicle means adapted to be positioned adjacent an exhaust opening of said mobile object, said intake means being connected to reactive means on said vehicle means engageable by said exhaust gases for converting the kinetic energy of said exhaust gases to an output force, and output drive means on said vehicle means driven by said reactive means, said output drive means applying said output force to propel said vehicle means and thereby effecting an augmentation of the thrust applied to said object by said exhaust gases.

19. Thrust augmenting means as set forth in claim 18 wherein said jet propelled mobile object is a jet propelled airplane and said vehicle means is a wheeled dolly, said reactive means comprising turbine means mounted upon said dolly, and said turbine means being connected to said output drive means by motion transmitting means.

20. Thrust augmenting means as set forth in claim 18 wherein said output drive means comprises rotary driving means.

21. Thrust augmenting means as set forth in claim 18 wherein said jet propelled mobile object comprises a jet car and said vehicle means is a wheeled dolly, said reactive means comprising a turbine means mounted upon said dolly, and said turbine means being connected to said output drive means by motion transmitting means.

References Cited

UNITED STATES PATENTS

| 2,307,125 | 1/1943 | Goddard | 244—63 |
| 2,606,725 | 8/1952 | Dreibelbis | 244—63 |
| 2,939,310 | 6/1960 | Cotton et al. | 244—63 XR |

FOREIGN PATENTS

| 980,030 | 12/1950 | France. |

MILTON BUCHLER, *Primary Examiner.*

P. E. SAUBERER, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,903                              September 10, 1968

Robert B. Cotton

It is certified that error appears in the above identified patent and that said Letters Patent are hereby corrected as shown below:

Column 1, lines 10 and 11, "airline" should read -- airplane --.
Column 2, line 5, "diagramatic" should read -- diagrammatic --.
Column 4, line 12, "bow" should read -- flow --.

Signed and sealed this 17th day of February 1970.

(SEAL)
Attest:

Edward M. Fletcher, Jr.                        WILLIAM E. SCHUYLER, JR.
Attesting Officer                                     Commissioner of Patents